(12) United States Patent
Gurumurthi et al.

(10) Patent No.: US 7,475,321 B2
(45) Date of Patent: Jan. 6, 2009

(54) DETECTING ERRORS IN DIRECTORY ENTRIES

(75) Inventors: Sudhanva Gurumurthi, State College, PA (US); Arijit Biswas, Holden, MA (US); Joel S. Emer, Acton, MA (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 11/027,391

(22) Filed: Dec. 29, 2004

(65) Prior Publication Data

US 2006/0156155 A1 Jul. 13, 2006

(51) Int. Cl.
*G06F 11/00* (2006.01)
*G06F 11/30* (2006.01)
*G08C 25/00* (2006.01)
*H03M 13/00* (2006.01)
*H04L 1/00* (2006.01)

(52) U.S. Cl. .................. 714/746; 711/141; 711/155; 707/3; 707/4

(58) Field of Classification Search ............... 714/758, 714/746; 711/141, 155; 707/3–4
See application file for complete search history.

(56) References Cited

U.S. PATENT DOCUMENTS 7,167,955 B1 * 1/2007 Neils et al. ............. 711/141

OTHER PUBLICATIONS

Weaver, C., J. Emer, S. Mukherjee, and S. Reinhardt. *Techniques to Reduce the Soft Error Rate of a High-Performance Microprocessor.* Proceedings, 31st Annual International Symposium on Computer Architecture 2004. Jun. 2004. pp. 264-275.
Prvulovic, M., Z. Zhang, J. Torrellas. *ReVive: Cost-Effective Architectural Support for Rollback Recovery in Shared-Memory Multiprocessors.* In Proceedings of the International Symposium on Computer Architecture. May 2003. pp. 111-122. (http://systems.cs.colorado.edu/ISCA2002/FinalPapers/prvulovicm_recovery.pdf).
Papamarcos, M. and J. Patel. *A Low Overhead Coherence Solution for Multiprocessors with Private Cache Memories.* In Proceedings for the International Symposium on Computer Architecture (ISCA). Jun. 1984. Abstract.

* cited by examiner

*Primary Examiner*—Guy J Lamarre
(74) *Attorney, Agent, or Firm*—Trop, Pruner & Hu, P.C.

(57) ABSTRACT

In one embodiment, the present invention includes a system, which may be a multiprocessor system having multiple nodes, each with a processor and a cache. The system may include a directory stored in a memory that includes entries having coherency information. At least one of the nodes may be configured to detect an error in an entry of the directory based on a coherency protocol and a state of a status indicator and presence vector of the entry, and without the storage of error correction or parity information in the entry. In some embodiments, the node may correct the error using state information obtained from other nodes.

13 Claims, 4 Drawing Sheets

DETECTING ERRORS IN DIRECTORY ENTRIES

BACKGROUND

Embodiments of the present invention relate generally to error detection and/or correction in a semiconductor device.

Single bit upsets or errors from transient faults have emerged as a key challenge in semiconductor design. These faults arise from energetic particles, such as neutrons from cosmic rays and alpha particles from packaging material. These particles generate electron-hole pairs as they pass through a semiconductor device. Transistor source and diffusion nodes can collect these charges. A sufficient amount of accumulated charge may change the state of a logic device such as a static random access memory (SRAM) cell, a latch, or a gate, thereby introducing a logical error into the operation of an electronic circuit. Because this type of error does not reflect a permanent failure of the device, it is termed a soft or transient error.

Soft errors become an increasing burden for designers as the number of on-chip transistors continues to grow. The raw error rate per latch or SRAM bit may be projected to remain roughly constant or decrease slightly for the next several technology generations. Thus, unless error protection mechanisms are added or more robust technology (such as fully-depleted silicon-on-insulator) is used, a device's soft error rate may grow in proportion to the number of devices added in each succeeding generation. Additionally, aggressive voltage scaling may cause such errors to become significantly worse in future generations of chips.

Bit errors may be classified based on their impact and the ability to detect and correct them. Some bit errors may be classified as "false errors" because they are not read, do not matter, or they can be corrected before they are used. The most insidious form of error is silent data corruption ("SDC"), where an error is not detected and induces the system to generate erroneous outputs. To avoid silent data corruption, designers often employ error detection mechanisms, such as parity. Error correction techniques such as error correcting codes (ECC) may also be employed to detect and correct errors, although such techniques cannot be applied in all situations.

In a multiprocessor system, each individual processor core typically includes an internal cache memory, and often a hierarchy of internal caches. Furthermore, each processor often has a portion of the system's main memory locally attached. Because the main memory is shared by all processor cores and is also accessed and cached locally within each core or node, coherency mechanisms are needed to ensure that operations performed on memory maintain coherency.

A prior art cache coherency protocol includes a plurality of states in which a cache line may reside, namely mutual, exclusive, shared, and invalidated (MESI) states. Modern multiprocessor systems often employ a directory-based coherence mechanism, in which the state of a memory block in each of the caches is maintained in a table referred to as a directory. Such directories often include parity bits and/or error correction codes (ECC) in order to detect and correct errors occurring in the directory. However, these mechanisms consume real estate and also incur power penalties and processing time.

Accordingly, a need exists to improve error detection and correction mechanisms in a directory-based cache coherency protocol.

DETAILED DESCRIPTION

Figure 1:
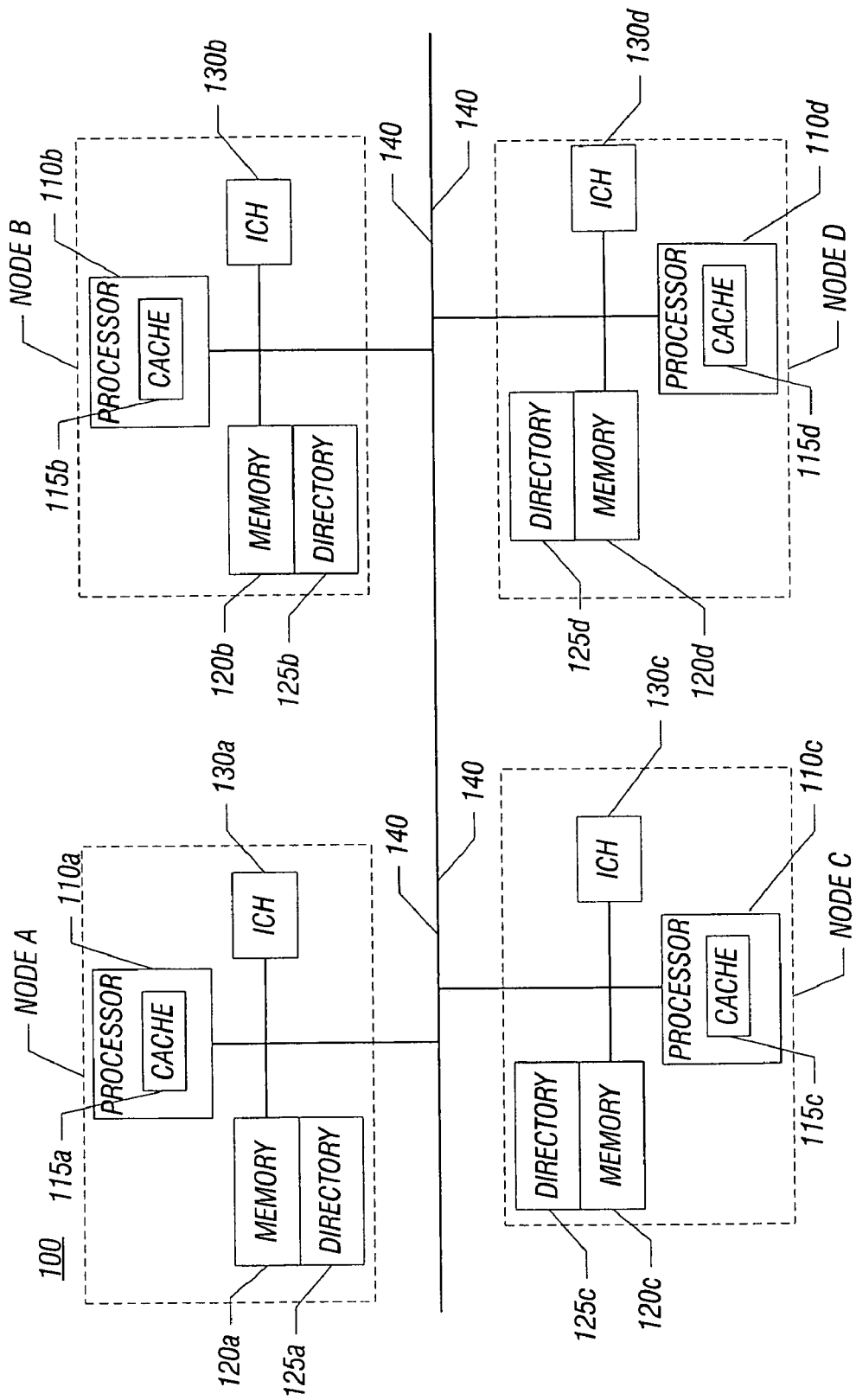
FIG. 1 is a block diagram of a multiprocessor system in accordance with one embodiment of the present invention.

Referring now to FIG. 1, shown is a block diagram of a multiprocessor system 100 in accordance with one embodiment of the present invention. As shown in FIG. 1, system 100 includes a plurality of nodes A-D each including one of a plurality of processor cores 110a-d (generically, processor 110). While shown in this embodiment as including four processor cores, it is to be understood that fewer or additional such processors may be present in a given system.

Each processor 110 has an internal cache hierarchy 115a-d (generically, cache 115) which may be one or more cache memories associated with a corresponding processor. Furthermore, a portion of main memory 120a-d (generically, memory 120), which may be a dynamic random access memory (DRAM), is coupled to each processor 110 locally. Within each local portion of main memory 120, a directory portion 125a-d (generically, directory 125) is present. Directory 125 is thus distributed across each of the nodes of system 100. Each directory 125 maintains the state information pertaining to the physical memory blocks local to a given node. For example, directory 125a maintains the state information for physical memory 120a with which it is associated. In such manner, node A of FIG. 1 is the home node for main memory 120a attached to it. While shown in FIG. 1 as being distributed across each of the nodes of system 100, a directory may be stored in main memory in other embodiments.

As shown in Table I below, a directory entry may include status information and a presence vector. The status information may include various bits corresponding to the status of a given cache line.

TABLE I

| Dirty Bit | Presence Vector |
|---|---|
| ←— 1b —→ | ←——— Number of Nodes ———→ |

As shown in Table I, one such status bit may be a dirty bit, denoting that the corresponding cache line has been modified in one of the caches. As further shown in Table I, a presence vector is included in the directory entry. The presence vector includes a plurality of bits, each of which corresponds to a node of the system. Any of these presence bits that are set denotes that the corresponding node has that block of memory in its cache. Coherency may be enforced by communication between the nodes and the directory as dictated by a given coherency protocol.

Referring back to FIG. 1, each node also includes an input/output (I/O) controller hub (ICH) 130a-d (generically, ICH 30) that may be used to couple a given node to various input/output or other peripheral devices. Each of the nodes may be coupled together via an interconnection network 140, which may be a high-speed bus to enable communications between the different nodes. As shown in FIG. 1, each of nodes B, C, and D have corresponding circuitry to that discussed above regarding node A, although different components may be present in other embodiments.

While shown with a particular configuration in FIG. 1, it is to be understood in other embodiments a multiprocessor system may be configured differently. For example, in some embodiments nodes may be coupled together in a point-to-point configuration, for example, a common system interface (CSI) configuration or the like.

In various embodiments, directory entries may be maintained without the use of ECC and without even parity mechanisms, in some embodiments. While these embodiments do not include any information-redundant schemes, errors within directory entries may still be detected and even corrected.

In order to provide error detection in accordance with an embodiment of the present invention, directory entries may be analyzed to determine whether they are in compliance with an architecturally correct execution (ACE) state of a system. That is, the cache coherency protocol itself may be used to detect errors within directory entries, allowing for error detection to be integrated into the coherence protocol itself. As will be discussed below, in one embodiment a home node may detect errors in its associated directory entries.

In terms of cache coherency, an architecturally correct execution (ACE) may be defined jointly by the state present in a directory, as well as that of the caches. That is, the directory itself has only a partial view of the global state. However, based on this view it may be inferred if the global state of the directory entry exhibits ACE. Accordingly, the state of a directory entry may be in one of two state spaces, namely an ACE space and an un-ACE space. A directory entry that is in the ACE space complies with the cache coherency protocol, while a directory entry in the un-ACE space violates the cache coherency protocol.

Referring now to Table II, shown is an example of an ACE space directory entry and an un-ACE space directory entry.

TABLE II

| ACE Space Entry | | | | Un-ACE Space Entry | | | |
|---|---|---|---|---|---|---|---|
| 1 | 1 | 0 | 0 | 1 | 1 | 1 | 0 |

The entries of Table II (and following Tables) use the following notation. The first block of an entry (having a single bit) represents a dirty bit, while the other block (having 3 bits in Table II) represents nodes of the system. Thus, the entries in Table II include a dirty bit and a presence vector having three bits indicating a three-node system. As shown in Table II, the ACE space entry includes a set (i.e., a logic one) dirty bit and a presence vector that indicates that only a single node has an exclusive copy of the corresponding memory block. Accordingly, this directory entry is in the ACE space, as it complies with a cache coherency protocol. The discussion herein assumes a MESI protocol, although the scope of the present invention is not so limited.

An error, such as a soft error, may cause one of the presence bits to flip from 0 to 1, leading to the un-ACE space entry in Table II. As only one node of a system can have an exclusive copy of a memory block, the un-ACE space directory entry shown in Table II is thus in violation of the cache coherency protocol, and this error may be detected in accordance with an embodiment of the present invention.

Referring now to Table III, shown are two exemplary ACE space directory entries for a four-node system. Thus there are four bits in the presence vectors of Table III. Table III also shows a single un-ACE space directory entry that may be caused by a certain bit flipping in either of the ACE space entries.

TABLE III

| ACE Space Entry | | | | | Un-ACE Space Entry | | | | |
|---|---|---|---|---|---|---|---|---|---|
| 0 | 1 | 1 | 0 | 0 | 1 | 1 | 1 | 0 | 0 |
| 1 | 1 | 0 | 0 | 0 | | | | | |

The top ACE space directory entry of Table III shows that the dirty bit is clear (i.e., the corresponding block is in the shared state) and that two nodes are sharing the data (shown by the two set bits in the presence vector). The bottom ACE space entry shows the dirty bit set, indicating that the cache line is dirty and that a single node has an exclusive copy of the memory block. Both of these entries comply with the cache coherency protocol.

As shown in Table III, the un-ACE space directory entry indicates a situation where the dirty bit is set along with multiple presence bits. This entry can indicate one of two situations, namely that the block was in a shared state and the dirty bit flipped, or that the cache line is dirty and one of the presence bits flipped. Accordingly, the un-ACE space directory entry may manifest itself as a visible coherency protocol violation, thus causing the error to be detected without the use of parity or ECC.

Referring now to Table IV, shown are two ACE space directory entries and a corresponding un-ACE space entry that may occur via a single bit error in either of the ACE space entries. In a similar manner to that described with respect to Table III, the transitions from ACE space entries to an un-ACE space entry that are shown in Table IV may also manifest themselves as protocol violations.

TABLE IV

| ACE Space Entry | | | | | Un-ACE Space Entry | | | | |
|---|---|---|---|---|---|---|---|---|---|
| 0 | 0 | 0 | 0 | 0 | 1 | 0 | 0 | 0 | 0 |
| 1 | 1 | 0 | 0 | 0 | | | | | |

As shown in Table IV, the un-ACE space entry indicates that either the cache line is not owned by a node in the system or that the cache line is dirty and one of the presence bits has flipped. Because neither of these situations comply with a MESI protocol, this directory entry is in the un-ACE space and may lead to error detection without the use of parity or ECC.

In some situations, a single bit error such as a soft error may occur within a directory entry and no transition to an un-ACE space occurs. That is, the error may cause an entry to transition from a first ACE space to a second ACE space. For example, as shown in Table V, both entries are in the ACE space.

TABLE V

Ace Space Entries

| 0 | 1 | 0 | 0 | 0 |
|---|---|---|---|---|
| 0 | 1 | 1 | 0 | 0 |

While the bottom ACE space entry in Table V may be considered a silent error, in some embodiments false errors may be avoided. False errors are errors that do not affect correct execution of a system.

For example, assume that in the second node, which corresponds to the presence bit that flipped between the first ACE space entry and the second ACE space entry, the corresponding cache line has been replaced. A later receipt of an invalidation message to this line in the second node due to an upgrade or a read-exclusive operation by another node has no effect on the second node. Instead, a wasted network transaction occurs.

This wasted network transaction may be avoided if the second node sends a message to the home node of the directory entry to reset its presence bit when it undergoes a line replacement. Such a message may be referred to as a replacement hint. If a given coherence protocol does not cause a replacement hint to be sent to a home node, the single bit error shown in the second ACE space entry of Table V has no effect on system correctness. Thus where such invalidation messages are contemplated by a communication protocol, later invalidation messages for non-resident cache lines may be ignored by a receiving node. Accordingly, by not detecting an error on the bit flipping shown in Table V, a false error may be avoided.

Thus in various embodiments, a directory may be implemented without parity and ECC data, saving space in main memory. Space savings may be particularly realized in large directory systems. Furthermore, parity may cause false errors, i.e., errors that do not affect correct execution, increasing a system's error rate. As described above, a transition from first to second ACE spaces, although technically an error, may not affect the correctness of execution. Because embodiments of the present invention are based on the properties of cache coherence itself, such false errors may be avoided. In such manner, silent data corruption and false errors due to single bit upsets may be avoided.

In other embodiments, error correction may be implemented to recover from single bit errors such as soft errors in a directory entry. Specifically, when a home node detects an error in a directory entry, it may initiate transactions between itself and other nodes in the system. These transactions may obtain the correct state, which can then be used to correct the directory entry accordingly. In some embodiments, these request-response transactions may occur on a separate recovery channel, avoiding deadlocks. After these message exchanges between the home node (that detected an error in the entry) and some or all of the other nodes in the system, the correct directory state may be restored and made visible to other transactions. In various embodiments, the directory entry may be locked (e.g., placing it into a busy state) until all error recovery transactions are completed.

Figure 2:
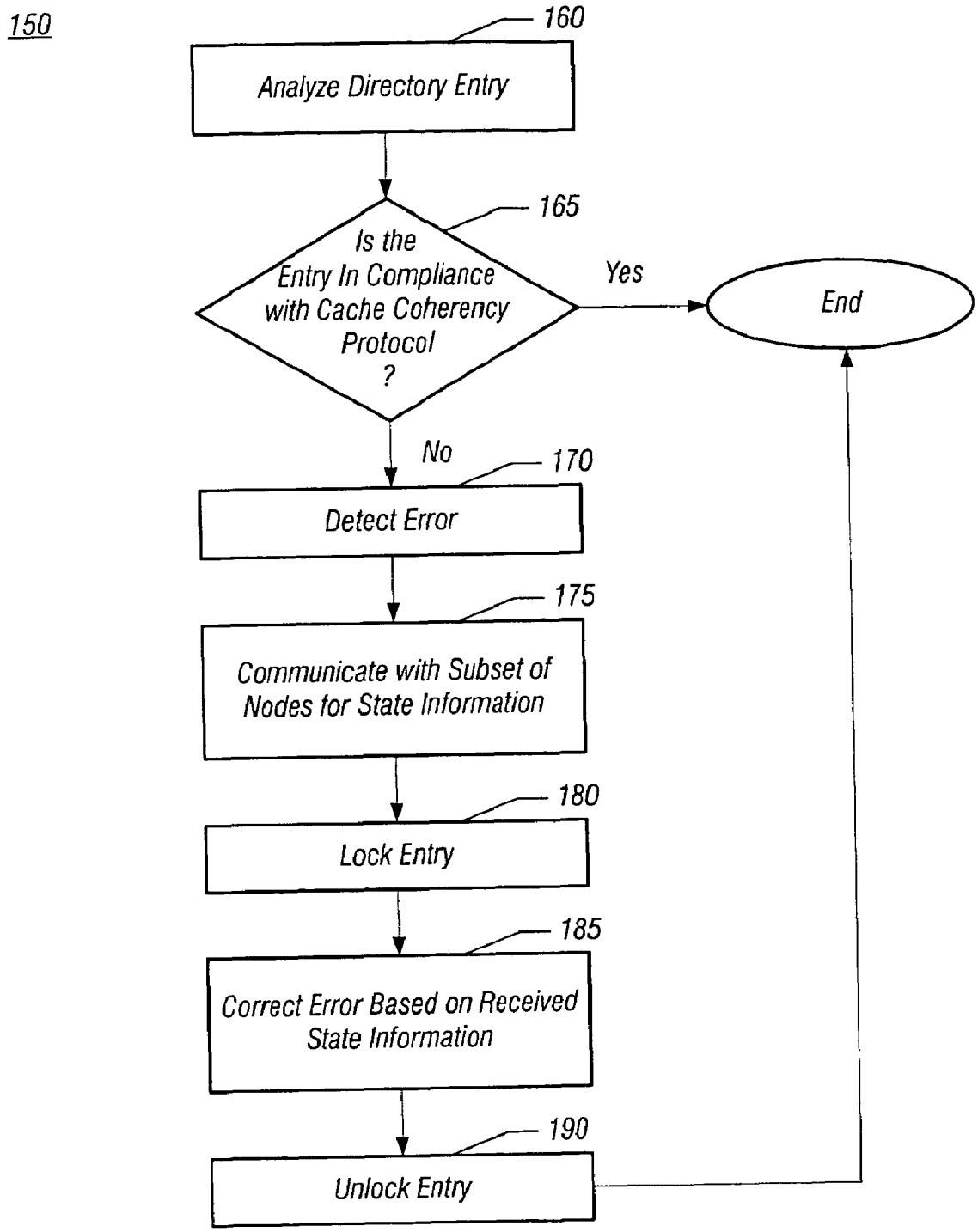
FIG. 2 is a flow diagram of a method in accordance with one embodiment of the present invention.

Referring now to FIG. 2, shown is a flow diagram of a method in accordance with one embodiment of the present invention. As shown in FIG. 2, method 150 may be used to detect and correct errors in a directory entry. As shown in FIG. 2, method 150 may begin by analyzing a directory entry (block 160). For example, a home node associated with the directory entry may analyze the entry. Specifically, the entry may be analyzed to determine whether it is in compliance with a cache coherency protocol (diamond 165). As described herein, such compliance may be tested by determining whether an entry is in an ACE space or an un-ACE space. In other embodiments, other manners of determining compliance with the cache protocol may be used. For example, in some embodiments a parity bit may be present in the entry and used to determine whether there is an error. If the entry is in an ACE space, method 150 may end, as no error is present.

If the entry violates the cache coherency protocol, an error is detected (block 170). In some embodiments, error detection only may be provided, and accordingly, method 150 may end after detection of an error. Such an error indication may be passed along to a cache controller or other mechanism to cause a machine-check exception or other error processing activity to occur.

In embodiments in which error correction is also provided, method 150 continues by communicating with a subset of nodes in the system for state information (block 175). For example, the home node may send a request for state information to all other nodes of the system, or a fewer number of such nodes. At the same time, the home node may lock the entry (block 180). For example, the home node may put the entry into a busy state.

When the receiving nodes send the state information back to the home node, the home node may correct the error based on the received state information (block 185). For example, the home node may replace a bit error corresponding to a presence vector or a dirty bit based on the returned messages. Finally, after correcting the error the home node may unlock the entry (block 190), making it available for other nodes and visible to other transactions.

Figure 3:
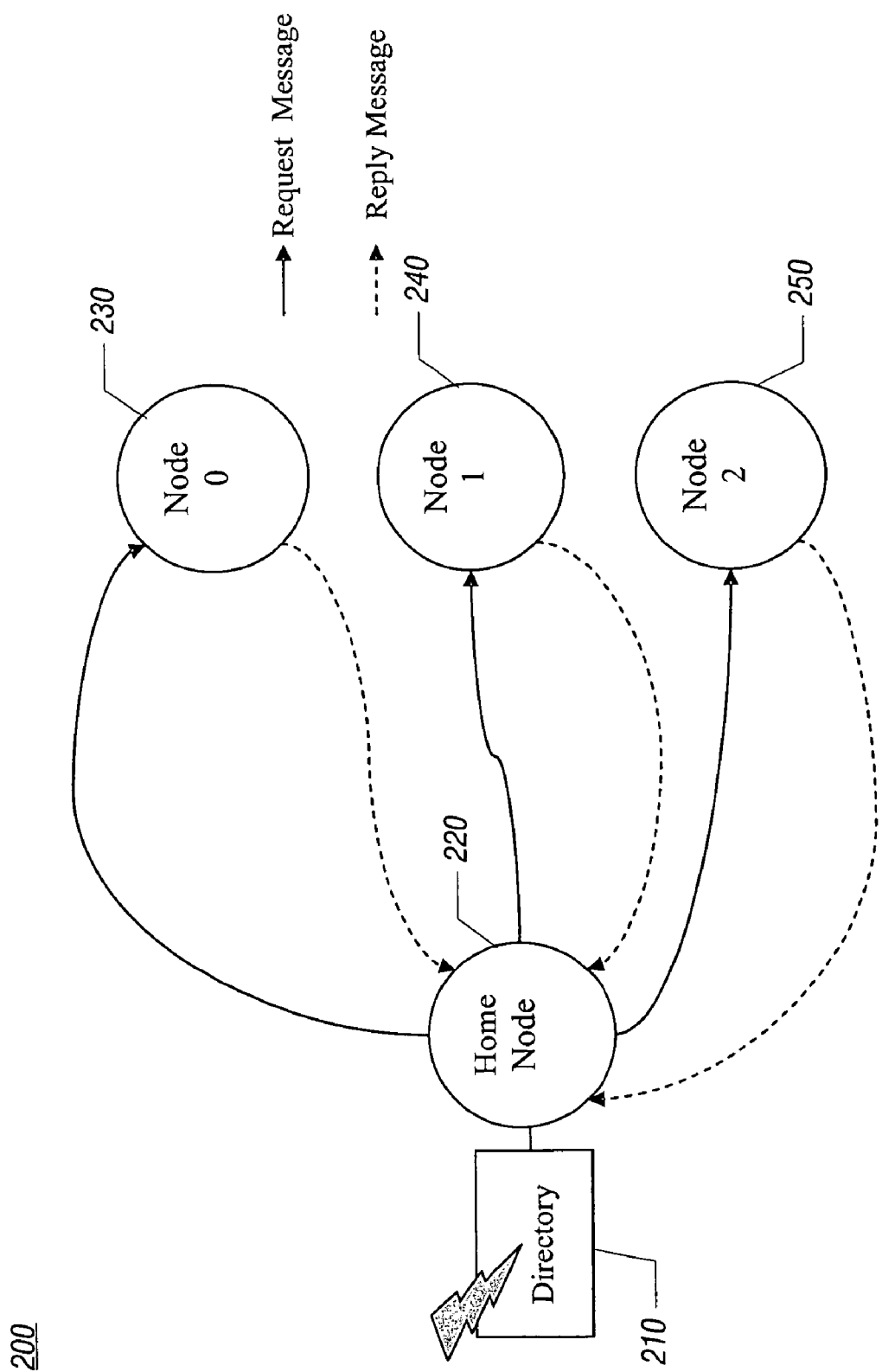
FIG. 3 is a sequence of operations for a recovery mechanism in accordance with one embodiment of the present invention.

Referring now to FIG. 3, shown is a sequence of operations for a recovery mechanism in accordance with one embodiment of the present invention. As shown in FIG. 3, a multiprocessor system 200 includes four nodes, namely a home node 220, a second node (i.e., node 0) 230, a third node (i.e., node 1) 240, and a fourth node (i.e., node 2) 250. In one embodiment, each of these nodes may correspond to one of nodes A-D shown above in FIG. 1.

As shown in FIG. 3, home node 220 has a directory portion 210 associated therewith. In operation, home node 220 detects an error within a given entry of directory 210. A cosmic ray may cause a soft error in the directory entry, as an example. Home node 220 may detect the error in various ways. For example, the error may be detected by determining that the entry is in the un-ACE space. Alternately, in a system using parity, the error may be detected by determining that a parity error exists. Still further, a combination of these techniques may be implemented. Other error detection mechanisms may also be used.

Upon discovery of such an error, home node 220 sends query messages to some or all of the other nodes. These query messages are shown in the solid lines extending from home node 220 to each of nodes 230, 240 and 250. The query messages may be a request for the state of the corresponding cache line (or directory entry) in each of the nodes. In turn, each of the nodes may send a reply message back to home node 220, as represented by the dashed lines. These reply messages may include the status for the requested cache line and/or directory entry. Based on the received replies, home node 220 may find the erroneous bit, and correct it in the entry of directory 210. Then that entry may be made available again to the other nodes of system 200.

Based on the given state of a directory entry determined to have an error, different request-response messages and actions may occur. For example, if an error such as that shown above in Table II is present, recovery may be performed by sending messages to the nodes that have their presence bits set, requesting the state of the corresponding cache line in their caches. If both nodes reply as having a clean copy of the cache line, the dirty bit (i.e., the single bit error) may be reset and normal operation may continue. If instead one of the nodes replies as having a dirty copy of the corresponding cache line, the presence bit of the node that does not have the dirty copy may be reset and normal operation may resume.

For an error such as that shown above in Table IV, either the cache line is not owned by any node in the system or the line is dirty and one of the presence bits is flipped. Recovery from such errors may proceed by querying a subset of nodes within the system (in this case, all nodes except the home node) regarding the state of the corresponding cache line in their caches. Based on the response messages, the directory entry may be corrected and normal operation resumed.

For an error that transitions a directory entry from a first ACE space entry to a second ACE space entry, as shown above in Table V, no recovery procedures are needed as the error may have no effect on correctness.

Referring now to Table VI, shown is a first ACE space entry denoting that it is shared, as indicated by a reset dirty bit.

TABLE VI

| Ace Space Entry | | | | | ACE Space Entry | | | | |
|---|---|---|---|---|---|---|---|---|---|
| 0 | 1 | 1 | 0 | 0 | 0 | 1 | 0 | 0 | 0 |

However, an error occurs, and one of the presence bits flips from a set state to a reset state, leading to a second ACE space entry. If a home node detects this error, recovery may be performed by sending a broadcast invalidation message to all nodes. The home node may wait for an acknowledgement message from each of the nodes, indicating whether they successfully invalidated the corresponding cache line or they ignored the message. In such manner, the cache line may be invalidated in sharers of the line even where the error does not present itself as a visible protocol violation.

In various instances, directory entries may include presence vector bits that correspond to additional nodes, i.e., nodes not present in a system. Because such nodes are not actually present, any errors in these bits do not cause incorrect execution and may be ignored. Thus an error occurring in presence bits corresponding to absent nodes do not cause request-response transactions to occur.

In various embodiments, deadlock scenarios may occur when recovery transactions are pending. For example, assume that a message from a first node is blocked on a directory entry at a second node, which is currently performing recovery operations. Because the recovery process causes the second node to send a recovery-related message to the first node, a deadlock may occur.

To prevent such situations, a recovery channel may be provided, which in one embodiment may be a high-priority recovery channel. Such a recovery channel may be incorporated as a separate set of links, a separate virtual channel, or the like. For example, in the embodiment of FIG. 1, recovery channels may be present between each of the nodes, and more specifically, between given processors and memories and along interconnection network 140.

Figure 4:
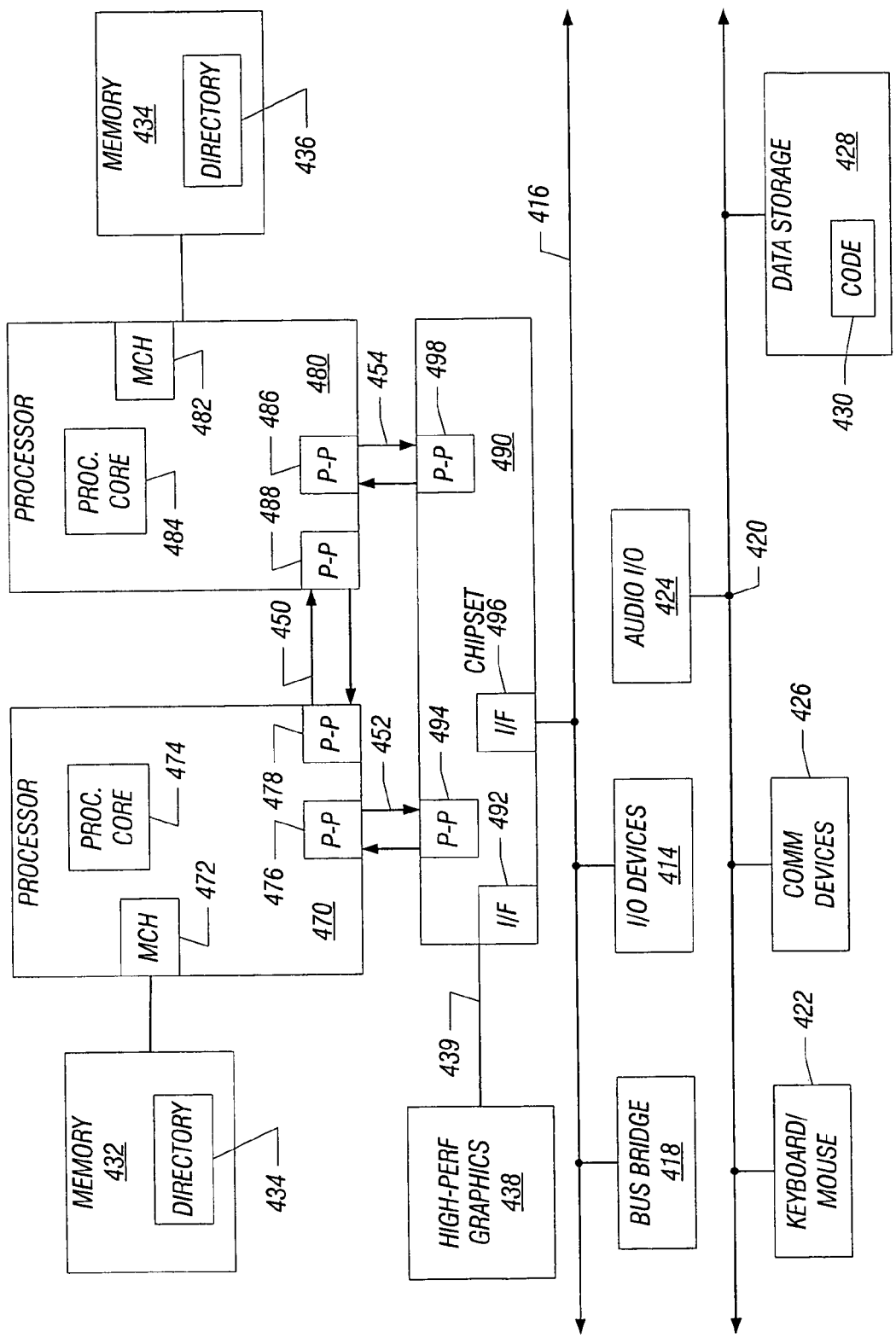
FIG. 4 is a block diagram of a multiprocessor system in accordance with another embodiment of the present invention.

As described above, in some embodiments, a multiprocessor system may be a point-to-point bus system, such as in a common system interface (CSI) system. Referring now to FIG. 4, shown is a block diagram of a multiprocessor system in accordance with another embodiment of the present invention. As shown in FIG. 4, the multiprocessor system is a point-to-point bus system, and includes a first processor 470 and a second processor 480 coupled via a point-to-point interconnect 450. First processor 470 includes a processor core 474, a memory controller hub (MCH) 472 and point-to-point (P-P) interfaces 476 and 478. Similarly, second processor 480 includes the same components, namely a processor core 484, a MCH 482, and P-P interfaces 486 and 488.

As shown in FIG. 4, MCH's 472 and 482 couple the processors to respective memories, namely a memory 432 and a memory 444, which may be portions of main memory locally attached to the respective processors. Each of memories 432 and 434 may include directories 434 and 436, respectively. These directories may include a plurality of entries for which the corresponding processor is the home node, such that the corresponding home node may detect and correct errors in the respective directory.

First processor 470 and second processor 480 may be coupled to a chipset 490 via P-P interfaces 452 and 454, respectively. As shown in FIG. 4, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision 2.0*, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation I/O interconnect bus, although the scope of the present invention is not so limited.

As shown in FIG. 4, various input/output (I/O) devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

analyzing an entry of a directory of a multiprocessor system;

detecting an error in the entry if a state of the entry is not architecturally correct, the error detected based on a violation of a cache coherency protocol in which the non-architecturally correct state of the entry includes a status indicator of a first state and a presence vector having a state inconsistent with the first state, and wherein the entry does not include error correction information or parity information; and correcting the error in the entry.

2. The method of claim 1, wherein correcting the error comprises querying from a home node at least one node of the multiprocessor system regarding a state of a copy of the entry in the at least one node.

3. The method of claim 2, further comprising responding to the querying by the at least one node.

4. The method of claim 3, further comprising reconstructing the entry based on the response to the querying.

5. The method of claim 3, further comprising querying and responding via a recovery channel.

6. The method of claim 1, further comprising detecting the error when the first state indicates a single node has an exclusive copy of a cache line corresponding to the entry, and the presence vector indicates that multiple nodes have the cache line stored in a cache of the associated node.

7. An article comprising a machine-readable storage medium containing instructions that if executed by a machine enable the machine to perform a method comprising:

detecting an error in an entry of a directory of a multiprocessor system, the error detected based on a violation of a cache coherency protocol in which the non-architecturally correct state includes a status indicator of a first state and a presence vector having a state inconsistent with the first state, and wherein the entry does not include error correction information or parity information; and correcting the error in the entry via communication between a home node and a subset of nodes of the multiprocessor system.

8. The article of claim 7, wherein the method further comprises detecting the error based on an architecturally incorrect state of the entry.

9. The article of claim 7, wherein the method further comprises correcting the error using state information regarding the entry provided by the subset of nodes.

10. A method comprising:

analyzing an entry of a directory of a multiprocessor system, the entry including a status indicator to denote whether a cache line corresponding to the entry has been modified in a cache associated with a processing node of the multiprocessor system and a presence vector including a plurality of bits each to indicate whether a processing node has the cache line in the associated cache;

detecting an error in the entry if a state of the status indicator and the presence vector do not comply with a cache coherency protocol, the error being detected based on the state of the status indicator and the presence vector; and correcting the error in the entry responsive to a query from a first processing node to at least a second processing node regarding a state of a copy of the entry in the at least second processing node and a reply to the query, by reconstructing the entry at least in part based on the reply.

11. The method of claim 10, further comprising detecting the error without use of error correction information or parity information.

12. The method of claim 11, further comprising integrating the error detection in the cache coherency protocol.

13. The method of claim 10, further comprising detecting the error when the first state indicates a single processing node has an exclusive copy of the cache line, and the presence vector indicates that multiple processing nodes have the cache line stored in the associated cache.

* * * * *